Jan. 28, 1969  R. C. DE VILLIERS  3,424,573
PROCESS FOR COMBINED OXYGEN IRON REFINING AND
PRODUCING OF FERROUS MELTS
Filed Oct. 22, 1965
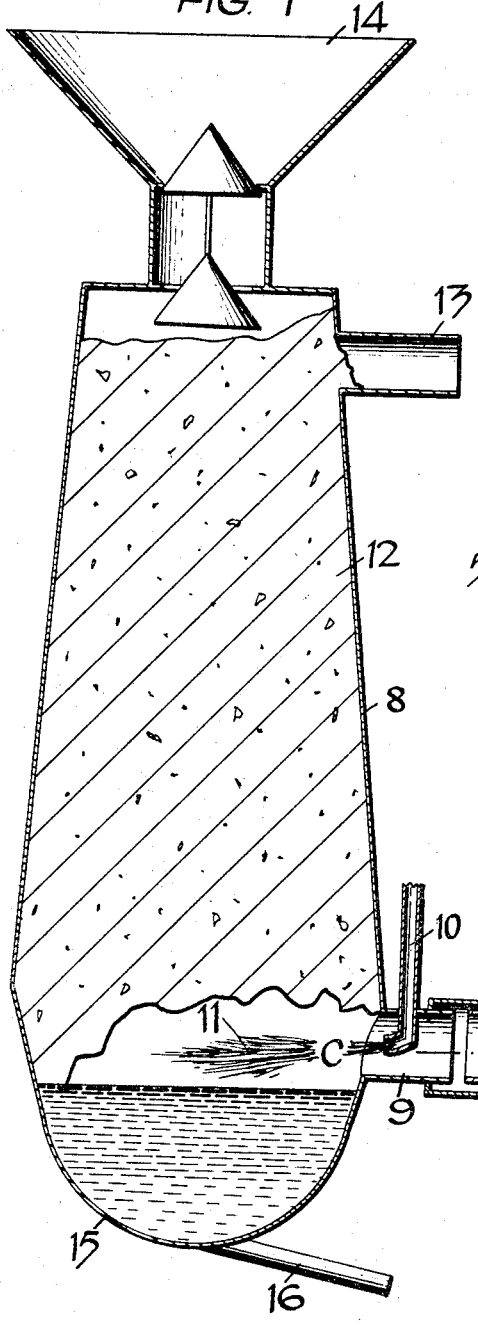
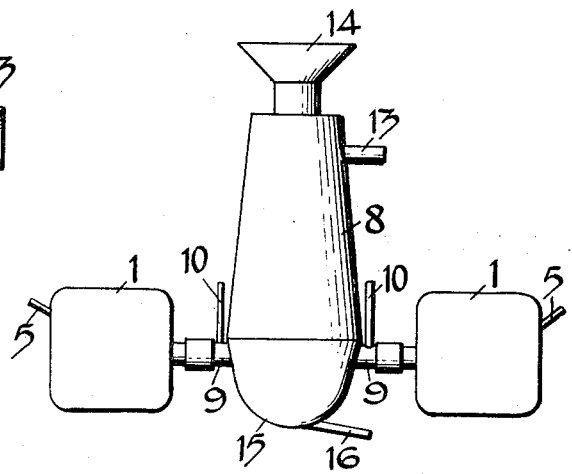
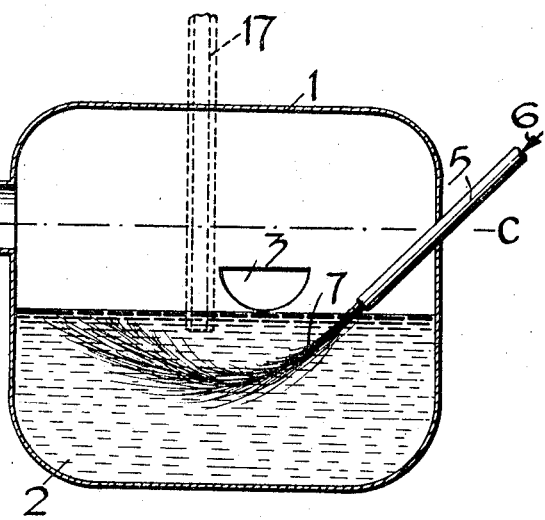
INVENTOR.
Rocco C. de Villiers
BY Fraser and Bogucki
attorneys

United States Patent Office

3,424,573
Patented Jan. 28, 1969

3,424,573
PROCESS FOR COMBINED OXYGEN IRON REFINING AND PRODUCING OF FERROUS MELTS
Rocco Catoggio de Villiers, 249 Murray St., Brooklyn, Pretoria, Transvaal, Republic of South Africa
Filed Oct. 22, 1965, Ser. No. 501,562
Claims priority, application Republic of South Africa, Nov. 2, 1964, 64/5,215
U.S. Cl. 75—43        10 Claims
Int. Cl. C21c 5/40, 5/32

ABSTRACT OF THE DISCLOSURE

A system for refining ferrous metal with oxygen in which the gases from the refining chamber are directed to a second chamber containing a pile of scrap or pig iron and mixed with oxygen-containing gas so that the constituents that are not entirely combusted will further oxidize to provide and transfer sufficient heat to the scrap or pig iron to melt same.

---

The present invention relates to processes and apparatus for the separate, simultaneous, interdependent production of ferrous melts, e.g. molten scrap or molten iron on the one hand and refined iron or steel on the other hand utilising principally unrefined or partially refined iron, oxygen in various concentrations and cold scrap or cold pig iron.

A great need exists for steel producing processes which consume large amounts of scrap due to the present abundance of scrap.

A process which produces molten scrap in a separate vessel from that of the iron refining vessel has the advantage that two types of steel can be produced simultaneously from one process depending on the additives in each of the two vessels. Another advantage is that greater control is available over the process, even where the molten scrap and refined iron must be mixed, due to the added flexibility.

A great need also exists for steel producing processes where hot unrefined iron is not available from a blast furnace and cold pig iron is the basic raw material.

One embodiment of the invention described here utilises oxygen blowing of molten unrefined iron and scrap and produces refined iron or steel as well as molten scrap which can be kept separately or mixed together, the combined weight of which has a larger proportion of molten scrap than any known pneumatic or oxygen process, over 50% being attainable depending on the analysis of the raw iron, an improvement of about 20% over the best previously reported.

Another embodiment of the invention utilises oxygen blowing of molten unrefined iron and cold pig iron and produces refined iron or steel as well as molten pig iron in such large quantities that it is possible to use the molten pig iron subsequently as the molten unrefined iron to be refined by oxygen blowing thereby resulting in a process which is substantially not dependent eventually on any other source of molten unrefined iron and is substantially not dependent on external fuels such as coke, tar, oil, etc.

An object of the present invention is an oxygen blowing steel refining process which consumes large quantities of scrap.

A further object of the invention is to provide an oxygen refining process and/or means which melts pig iron thereby providing the raw unrefined hot metal without recourse to other sources for the hot metal for the oxygen refining.

Various steel making processes are known or have been published or proposed (prior art processes), which use a substantially pure or highly concentrated oxygen jet that impinges on, and in some cases penetrates, the surface of molten unrefined iron, causing undesirable constituents in the unrefined iron, such as silicon and some carbon, to chemically unite with the oxygen thereby refining the iron, releasing gases and heat.

Various methods are known or have been proposed to utilise some of the heat thus liberated or made available.

In the L.D. (surface blowing) process scrap is introduced into the vessel containing the melt being refined. Heat is transferred to the scrap partly by convection from the liquid, partly by radiation and partly by convection from the gases outside the molten bath, the heat transfer by the latter two methods being rather small as a substantial portion of the solid scrap is below the bath level. No use is made of any chemical energy left in the escaping gases.

In German patent specification 1,176,683 it is proposed to place scrap outside an L.D. top blowing bath on the bottom of a horizontal vessel and passing the hot flue gases from the top blowing process over the surface of the scrap. The sensible heat of the flue gases is utilised but poorly, sufficiently only to result in preheating but not in melting of the scrap. Accordingly it is necessary to apply substantial additional heat by means of roof burners consuming extraneous fuel. Similar roof burners are proposed for a twin hearth by Yawata. In both cases the consumption of extraneous fuel is substantial. The heat content of the flue gases is utilised inefficiently and the dust content of the flue gases even shields the scrap against full utilisation of the heat of the roof burners.

A tandem hearth process has also been proposed in accordance with which flue gases from iron refining are passed over the scrap in the second hearth where additional oxygen is blown into the gas stream from above in order to liberate further heat of combustion. However, the resulting flame can only affect the exposed parts of the scrap and is partly shielded by the dust of the flue gases. The sensible heat of the flue gases and dust is largely wasted and the scrap is merely preheated but not melted.

In most of the above processes the flue gases emerging from the process heavily loaded with dust, create considerable dust problems.

Finally an open hearth process has been known for many years in which the hot flue gases are passed from below upwards through a stack of scrap to result in preheating of the scrap. In this process it was essential to avoid any melting of the scrap since such melting would invariably affect the surface of the scrap pieces only, resulting in caking, surface adhesion and hence bridging.

In the aforementioned prior art processes, recoverable molten scrap cannot be produced without extraneous fuel separate from the refined iron, thereby eliminating a degree of freedom in manufacture.

Furthermore, according to these prior art proposals scrap loading is essentially on the basis of a batch process involving extensive equipment for rapid loading to avoid down time and is thus less economical than a continuous process. Also the continuous introduction of new scrap into the hot reaction zone in the prior art processes presents considerable mechanical handling complications.

Moreover, in the prior art processes, the furnace configuration cannot be made ideal for both iron refining and scrap heating as the requirements for each of these are in many respects different and not completely reconcilable.

Apart from the objects already mentioned, it is an object of the invention to overcome or mitigate the aforementioned disadvantages.

Other objects of the said invention will become apparent from the following description:

In one of its broad aspects, a ferro-metallurgical process in accordance with the present invention applicable to the art of refining a ferrous melt and of steel making, comprises refining a ferrous melt in an iron oxygen refining zone substantially below the surface of a bath of said melt by causing oxygen to combine with the undesired constituents of the melt to be refined, the gaseous products containing such proportions of carbon monoxide as to render the gas combustible passing said gases coming from the iron oxygen refining zone through a substantially vertical column of accumulated e.g., heaped, stacked or piled solid ferrous material, e.g., scrap or pig iron separate from the bath in an upward direction, oxidising the said carbon monoxide to carbon dioxide in a CO oxidation zone substantially within the lower portion of the solid ferrus material, the path of the gases from the CO oxidation, and in which gases the oxidation of carbon monoxide to carbon dioxide has been substantially completed, continuing upwardly through the solid ferrous material where said gases release a substantial proportion of their sensible heat by convection conduction before exhausting to waste, thereby preheating the cold ferrous material descending from above to make up for ferrous material being melted in the said oxidation zone substantially within the lower portion of the column, while cold ferrous material is charged in the relatively cold region at the top of the column.

According to a further aspect, the process in accordance with the invention comprises refining a ferrous melt with oxygen containing gas controlling said refining to produce a flue gas comprising carbon monoxide in combustible concentration, introducing additional oxygen into said flue gas to oxidise by combustion said carbon monoxide to carbn dioxide, said oxidation taking place at the bottom of a pile of ferrous material and completely melting the material constituting the bottom of said pile exclusively by means of the heat derived from the refining step and from the said oxidation of carbon monoxide.

The invention further provides for an apparatus comprising an oxygen blowing iron refining vessel having a flue gas outlet duct leading into the lower portion of a melting tower having tapping means for tapping off a melt and further comprising an inlet for the introduction of oxygen containing gases into the flue gas stream below the upper half of said melting tower.

In the following the invention will be described in greater detail, reference being made to specific examples and the accompanying drawings in which:

FIG. 1 illustrates diagrammatically in vertical section one embodiment of an apparatus in accordance with the invention for operating the process in accordance with the invention, and FIG. 2 represents a side elevation of a modification of said apparatus.

Referring to FIG. 1 of the drawings, into a first vessel 1 unrefined molten iron 2 is charged via port 3 together with other solids. Port 3 may also be used for flushing slag, as well as for discharging refined iron, although separate ports may be provided for these various functions. The vessel is capable of tilting about a centre line C—C, in the preferred embodiment according to the example, although an interchangeable or a fixed or rotatable vessel can be employed where convenient. The tilting vessel tilts to facilitate deslagging or flushing through port 3 during the period of refining. However, tilting can also be such that it can be used for charging and/or tapping and/or sampling either through additional port(s) or through port 3.

The oxygen 6 for refining is introduced via lance 5 through a nozzle in said lance. The vessel 2 contains iron undergoing refining in the form of a molten bath. Part of the reaction zone in the bath is shown at 7.

The oxygen injected into the iron oxygen refining zone is preferably substantially pure or of high concentration, but other substances may be introduced with the oxygen if their removal is too costly or their presence is desirable. These substances can be or become gaseous, near the iron refining zone so that the heat which these substances absorb will be subsequently released to the scrap in the scrap column. The presence of these substances increases the volume of gas to be handled, thereby necessitating the increase of the capacity of the flue suction fans, if any, as well as increasing the dimensions of the second vessel, thereby adding to the cost of the apparatus, which may be a disadvantage, if not compensated for by other process advantages or necessities. In most cases a small flue volume with a high carbon monoxide content will be aimed at.

Substances whose total removal may be too costly include the other gases in air when oxygen is produced from air.

When overheating occurs or is liable to occur in the bath of the first vessel, cold scrap or relatively cool molten scrap may be added. However, the scrap so introduced is a small portion of the total scrap melted per heat (being of the order of 20% of the weight of scrap melted per heat).

Suitable iron ore may be used for cooling in the first vessel in addition to or instead of the other solids, provided suitable fluxes and/or other chemicals used for the production of iron from iron ore are added.

Should the refractory above the bath in the first vessel overheat or be liable to overheat, a cold nonoxidising gas may be led over this refractory from a separate supply means, the heat so absorbed by this cooling means being returned to the scrap in the second vessel, and thus no or little wastage of heat occurs.

The lance 5 is water cooled and its outlet is placed very near the iron-slag interface or below it, the jet having sufficient velocity to prevent combustion in the throat of the nozzle(s) and to penetrate the molten bath without excessive scouring of the sides or bottom of the vessel, so that the oxygen reacts with the carbon in the bath to convert it to substantially carbon monoxide substantially below the bath surface so that no or little free oxygen is available above the surface to cause any further conversion of carbon monoxide to carbon dioxide.

The outlet of the oxygen lance, if blowing near the iron-slag interface, is preferably so arranged to produce (a) jet(s) or stream(s) of oxygen inclined at an angle of between 20° and 70° to the bath surface, to cause the creation of the maximum number of oxygen bubbles in the bath, so that an oxygen iron interface surface as large as possible is created.

If the outlet of the oxygen lance is placed far below the iron-slag interface, horizontal blowing is permissible.

The oxygen lance in the first vessel(s) may be nonstationary as required to prevent local over-refining and/or to improve mixing and for any other reasons.

The dimensions of the first vessel(s) are mainly determined by the size of the charge, for example 140 tons and the dimension of the region in which conversion of carbon to carbon monoxide takes place during refining substantially below the iron bath surface. For proper dimensioning of the first vessel, its walls should be located just beyond the region where the gas bubbles emerge from the bath, for a given rate of refining of iron per ton of oxygen per unit time, so that a minimum of scouring of the walls and/or floor occurs below the bath surface of the first vessel(s). The size is, however, further determined by the necessity for providing space for possible foaming of the bath, by providing an adequate height and/or adequate inner horizontal dimensions of the vessel space. For a charge of 100 tons of ferrous melt or more, say up to 150 tons, a single lance 5 having a nozzle 35 mm. in diameter is adequate. The bath will then be for example between 4 and 8 feet, say 6 feet deep and the oxygen will be introduced through lance 5 at a rate of approximately 4,000 to 7,000, say 5,000 normal cubic metres per hour.

The gases rich in carbon monoxide from vessel 1 proceed to a second vessel 8 in the form of a tower via a connecting duct 9 in which lance 10 is placed through which oxygen containing gas is blown in the direction of the tower interior. This produces a flame 11 to form a CO oxidation zone substantially within vessel 8 wherein scrap or pig iron column 12 is stacked.

The second vessel in the preferred apparatus is in juxtaposition to vessel 1. The scrap or pig iron column is usually provided by filling the vertical enclosure provided by vessel 8 to a height greater than its cross-sectional width. The said second vessel or tower 8 is preferably fixed although a tilting vessel may be used where convenient.

The CO oxidation zone, in the preferred embodiment of the invention is located at least predominantly and preferably wholly within the scrap heaped zone, the base of the second vessel above the molten scrap, thereby transferring heat to the scrap from the gases coming from the first vessel both by radiation and by gaseous convection, the gas combustion or oxidation being brought about by the introduction into or close to the mouth of the second vessel, of substantially pure oxygen, air enriched in oxygen or air, whichever is the most suitable depending on the size of the CO oxidation zone, the maximum temperature and the temperature levels in the scrap column desired to avoid bridging above the CO oxidation zone. The purer the oxygen, the more localised the melting zone becomes which is desirable. The diluted or preferably pure oxygen could also be introduced into the tuyere(s), pipe, tunnel, duct or like means connecting the first and second vessels or less preferably into the first vessel, provided these zones are well insulated thermally from the outside and the refractory can withstand the higher temperatures created by a portion of the radiation occurring outside the second vessel, as the flowing gases will absorb the heat from the areas exposed to radiation and release it in the second vessel to the scrap, so that substantially no heat wastage occurs, but this procedure is at present not preferred.

The oxygen for the CO oxidation zone may be introduced in any of the forms hereinbefore indicated via tuyeres or a lance in the second vessel or via a nozzle or a lance whose outlet is directed towards the inlet of this vessel, but is located in the connecting tunnel, pipe, duct, tuyere(s) or like means connecting the two vessels, or is located in the first vessel, provided the CO oxidation zone is substantially effective in the second vessel.

The CO oxidation zone when using air for the chemical reaction may obtain this air through false air entering near the entrance to the second vessel due to a negative pressure created in the second vessel, e.g. by a venturi effect or by suction applied to the exhaust end.

The configuration of the second vessel or tower, especially in its interior, preferably resembles that of a conventional blast or of a shaft furnace so that the loading of scrap or pig iron from above, support of the scrap or pig iron by the sides, the melt collection zone, if any, the gas flow vertically upwards, respectively correspond to the loading of the burden from above, the support of the burden by the side, the hearth, and the gas flow upwards in a blast furnace.

The horizontal cross-sectional dimensions of the second vessel are determined on the one hand by the necessity not to overheat the refractory by making it too small, and on the other hand by the requirement of allowing a sufficiently high temperature zone to be created for the scrap to melt. The said dimensions are further determined by pressure drop considerations for the passage of the oxidised carbon monoxide and other gases through the scrap column. The height of the scrap column is determined by well known heat transfer considerations so that nearly all the sensible heat of the gases is given up to the scrap, the final height being determined by economic considerations. One example of a second vessel has a hearth diameter of seven feet and a height of fifty feet.

Using the same numerical data as further above, vessel 8 may also be about 6 feet in diameter at its wide point and the unmolten scrap or pig iron height is about 14 feet. Scrap is charged from a scrap bin 14. The molten scrap is collected in the hearth bowl 15 and discharged periodically through port 16. Gas is discharged via opening 13 using an exhaust fan, or preferably under positive pressure if care is taken in sealing the two vessels and the connecting duct to prevent gas leakage. In order to allow vessel 1 to be tilted relative to vessel 8 a connection and seal is provided in the manner which is well known from the open hearth art.

The provision of a hearth bowl 15, as shown, integral with the bottom of the tower is preferred but not essential. The molten scrap may be caused to run under gravity from the second vessel into the first vessel, either intermittently by tapping the suitably shaped container of the second vessel, or continuously, whether the second vessel contains a suitably shaped container for collecting molten scrap or not.

Solids such as fluxes, alloying materials, fettling materials and/or other chemicals may be added to either or both vessels to produce the desired quality and type of steel or of other ferrous material and/or to produce the required processing conditions and/or to produce the required solidifying temperature in the second vessel. Deoxidants, particularly for the vessel containing the scrap or pig iron are Ferro silicon, Ferromanganese, coke, or in special cases, aluminium. The molten metal from the second vessel may be transferred to the first vessel, and thus be the whole or a part of the unrefined iron charged to the first vessel.

For providing heat during start up, breakdown or non-operation in the first vessel or towards the termination of the refining periods in the first vessel, fuels such as tar or mineral oil may be introduced at the bottom of the second vessel to mix and combine with oxygen introduced there by means of an oxy-fuel burner.

In an embodiment alternative to the position of lance 5, the lance is placed in the position 17 shown dotted. Vessel 1 may make provision for both alternative positions of the lance or for additional positions if desired.

When operating with an inclined lance 5 it is an advantage if the vessel 1 is of oblong shape, being longer in the direction of line C—C than in the other horizontal dimension. Typical horizontal dimensions would be of the order of 13 feet by 18 feet.

The cross sectional shape of the bottom of the vessel need not be as steep walled as shown but can also be adapted to the path followed by the oxygen jet at the angle of blowing selected.

When the use of a vertical lance 17 alone is preferred, a further modification of the invention provides for such lance to be immersed quite deeply, say as much as between 3 feet and 5 feet, say between 3½ feet and 4 feet, and preferably at least as far as the lower half of the depth of the melt. In that case the water-cooled lance would preferably be sheathed externally with a ceramic layer to avoid undue heat loss of the bath to the lance. The lance would preferably have multiple, substantially horizontally blowing nozzles at the bottom. Whilst the embodiment using an inclined lance above the bath surface employs high, preferably supersonic oxygen velocities, the present embodiment does not require such high velocities for the oxygen to permeate the bath. The gas bubbles which rise with little splashing will be substantially carbon monoxide.

It is not essential to employ multiple or horizontal nozzles. A single downwardly directed nozzle could, for example, serve the purpose.

The vessel could now advantageously have a shape of which the vertical dimension is the largest. It would preferably have a removable, e.g. dome-shaped lid incorporating or having mounted therein both the primary oxygen blowing lance 17 and the after burning lance 10, the nozzle of the latter extending into the flue outlet 9.

Charging of the vessel would be from the top after removal of the lid and preferably one or both lances as well. Discharging would take place by tilting as is the practice in the LD process.

In another embodiment of the apparatus in accordance with the invention illustrated in FIG. 2 more than one vessel (e.g. two) each comprising an iron oxygen refining zone, are used for iron refining and these are all connected to one vessel comprising the scrap column, wherein gas and scrap are in a counterflow. This latter vessel is now provided with more than one pipe, tunnel, duct, set of tuyeres or like connecting means, so that refining can take place simultaneously or consecutively in the vessels comprising the iron oxygen refining zones to make the overall process more continuous and/or to economise on equipment.

The vessels each comprising an iron oxygen refining zone will usually all be of the same type, but it may sometimes be useful or convenient to have various vessels each comprising an oxygen refining zone of different types.

The process in accordance with the present invention is attended by the advantage that it enables the melting of about 25% more scrap or pig iron per heat than the theoretical maximum possible if the sensible heat left after the carbon monoxide to carbon dioxide oxidation has occurred is wasted. Since sometimes in the known processes, due to dust, some heat radiation to the scrap is also prevented this advantage is usually greater. Often the scrap can be melted in a weight of the order of 100 percent of the weight of the molten unrefined iron, depending primarily on the analysis of the unrefined iron.

A further advantage is that all combustible gases, mainly CO, are completely combusted and the final flue gas temperature are low, say 200° C., so that no wastage of chemical or sensible heat occurs.

A further advantage is that should any shielding of the flame by dust in the second vessel occur, the heat is in any case returned by the heated dust to the scrap.

A further basic advantage is that molten scrap is produced substantially separately from the refined iron, thereby permitting more specific control over its processing and over the iron being refined.

Further advantages of the process in accordance with the present invention are that the lances and the like for the introduction of oxidising gas to the CO oxidation zone can be simply placed in the most convenient and correct position for good mixing of carbon monoxide with oxygen to ensure complete combustion of the carbon monoxide in the second vessel.

Furthermore, for example, the lance which is used for oxidising carbon monoxide to carbon dioxide can be conveniently arranged in such a manner that it is not easily damaged by the descending scrap, nor will be blocked by molten metal, slag or the like.

A further advantage is that the refractory for and the shape of the iron refining vessel and for/of the scrap melting vessel can be chosen to be ideal for each of these operations individually.

A further advantage is that the fluctuation of temperature over long operating periods, covering the production of many tap-to-tap periods in the first vessel, are minimised within each vessel, thereby decreasing thermal shock to the refractory and increasing its life, since, according to the invention, in the first vessel the refractory fluctuates only between the temperature of molten unrefined iron and molten refined iron, while in the second vessel the temperature gradient from top to bottom is nearly constant fluctuating virtually only due to the changing composition of the gases entering the second vessel.

A further advantage is that a minimum of refractory is exposed to heat flames in the second vessel because the melting zone is surrounded by scrap.

A further advantage is that the hot gases entering the second vessel always in their path encounter cold or substantially cold scrap to which they can transfer their heat more rapidly than to scrap which is heated in a batch operation.

A further advantage is that dust particles are thermally precipitated on the cold scrap thereby alleviating the gas cleaning problem.

A further advantage is that cold zones in the scrap cannot occur due to continuous movement of the scrap to the melting zone.

A further basic advantage is that no fuel other than undesirable constituents in the unrefined iron need be used, at least during the main period of operation, once the reaction has been started up.

A further advantage is that the scrap loading means are simple, working in a cool environment aided by gravity.

An important feature of the process is the counterflow resulting from the hot flue gases rising upwards and the column of solid ferrous material moving downwards melting at the bottom and being constantly replenished by cold ferrous material on top. Accordingly in the process in accordance with the invention softening and consequent mutual adherence of the scrap pieces and resultant bridging in the column is avoided everywhere, except within the lower part of the scrap column and preferably substantially within the base of the column by obtaining a high ratio of CO to $CO_2$ in the refining process and by controlling the purity of oxygen introduced for oxdising the CO to $CO_2$ such as to obtain sufficient localised concentration of heat for rapid melting in the melting zone only. By carrying out the oxygen refining step as herein described, the carbon in the ferrous melt is oxidised very predominantly to CO, $CO_2$ constituting as a rule 30% or less of the gases evolved.

What I claim is:

1. A ferro-metallurgical process applicable to the art of refining a ferrous melt and of steel making which comprises:
    (a) refining a ferrous melt with oxygen containing gas
    (b) controlling said refining to produce a flue gas comprising carbon monoxide in combustible concentration
    (c) introducing additional oxygen into said flue gas to oxidise by combustion said carbon monoxide to carbon dioxide, said oxidation taking place at the bottom of a pile of ferrous material and completely melting the material constituting the bottom of said pile exclusively by means of the heat derived from the refining step and from the said oxidation of carbon monoxide.

2. A process as claimed in claim 1 in which the refining step is controlled to yield predominantly CO from the combustion of carbon.

3. A process as claimed in claim 2 in which the refining step is controlled to yield a flue gas containing at the most 30% $CO_2$.

4. A process as claimed in claim 1 in which the pile of ferrous material is maintained higher than its largest horizontal diameter.

5. A process as claimed in claim 1 in which the flue gases are introduced to the pile of ferrous material under positive pressure.

6. A process as claimed in claim 1 in which said ferrous material is pig iron.

7. A process as claimed in claim 1 in which said ferrous material is ferrous scrap.

8. A process as claimed in claim 1 in which at least the ferrous melt refining step is carried out with substantially pure oxygen.

9. A process as claimed in claim 1 in which at least the combustion of carbon monoxide is carried out with the introduction of substantially pure oxygen.

10. A process as claimed in claim 1 in which both the ferrous melt refining step and the combustion of carbon monoxide are carried out with the introduction of substantially pure oxygen.

References Cited

UNITED STATES PATENTS

| | | | |
|---|---|---|---|
| 2,811,435 | 10/1957 | Bannister et al. | 75—60 |
| 3,171,877 | 3/1965 | Thring | 75—46 |
| 3,194,650 | 7/1965 | Kurzinski | 75—60 |
| 3,301,661 | 1/1967 | McGlynn et al. | 75—60 |
| 3,313,618 | 4/1967 | Feinman et al. | 75—60 |
| 2,833,643 | 5/1958 | Newman | 75—41 |
| 2,970,901 | 2/1961 | Rice | 75—41 |

L. DEWAYNE RUTLEDGE, *Primary Examiner.*

H. W. TARRING, *Assistant Examiner.*

U.S. Cl. X.R.

75—46, 60; 266—9, 29